UNITED STATES PATENT OFFICE.

EDWIN NILSSON, OF CHICAGO, ILLINOIS.

WRENCH.

1,208,627.  Specification of Letters Patent.  Patented Dec. 12, 1916.

Application filed June 15, 1914. Serial No. 845,179.

*To all whom it may concern:*

Be it known that I, EDWIN NILSSON, a citizen of Sweden, residing at Chicago, in the county of Cook and State of Illinois, have invented certain new and useful Improvements in Wrenches, of which the following is a specification.

This invention relates to improvements in wrenches and its object is to produce a wrench which can be very quickly and easily adjusted to its work and the parts of which, in use, operate as a unit and without danger of slipping or losing their relative adjustment.

With the foregoing and other objects in view the invention consists in the combination and arrangement of parts to be hereinafter fully described in the following specification, pointed out in the claim and illustrated in the accompanying drawing, which forms a part of said specification and in which—

Figure 1:
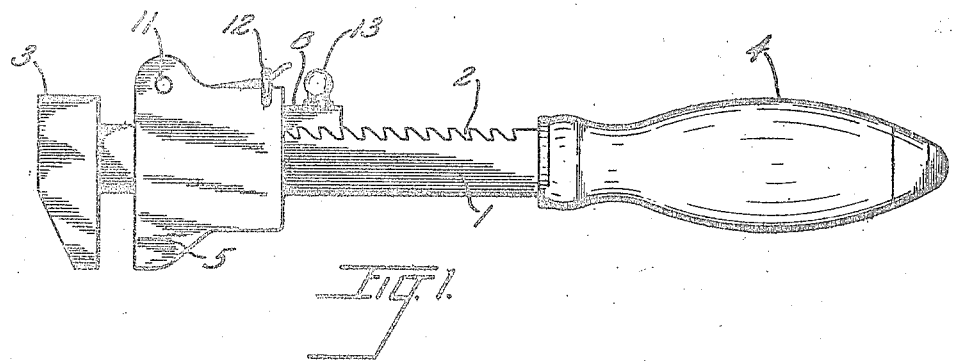
Figure 2:
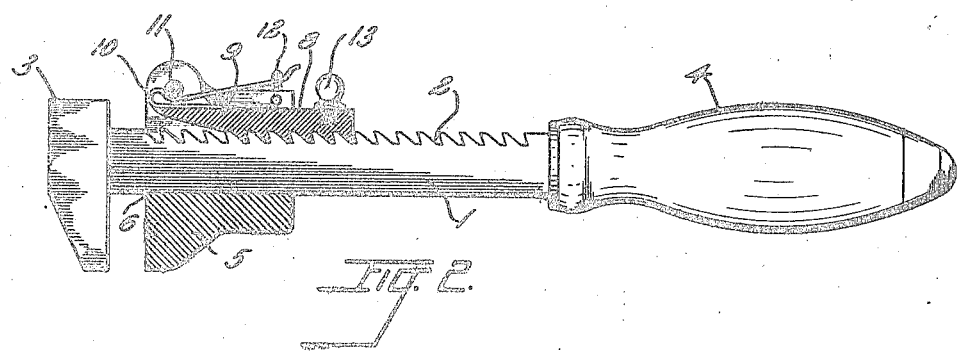
Figure 3:
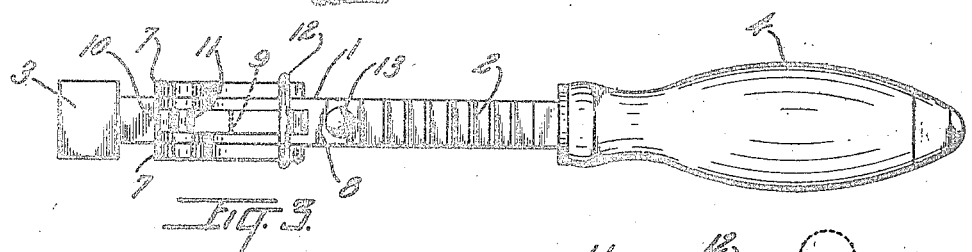
Figure 4:
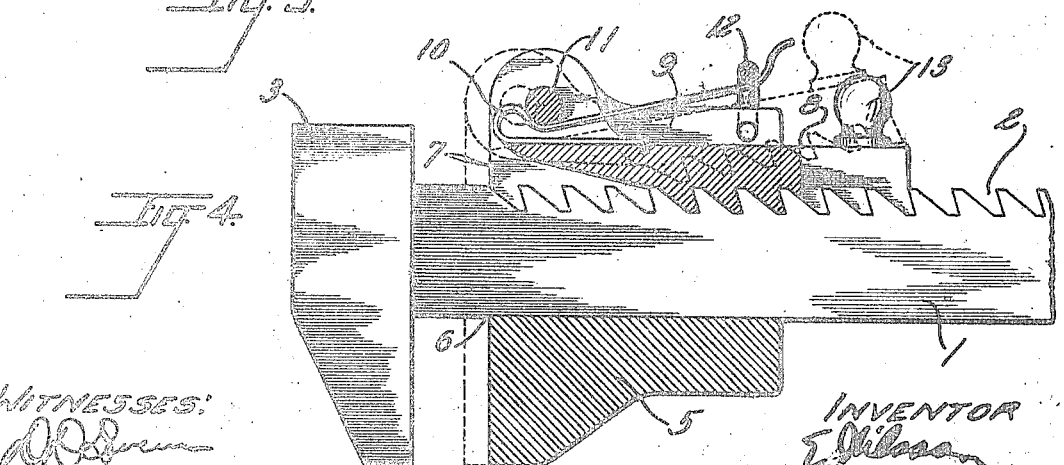

Figure 1 is a side elevation of my improved wrench. Fig. 2 is a similar view partly in section. Fig. 3 is a rear elevation. Fig. 4 is an enlarged portion of the tool partly in section.

Like reference characters indicate corresponding parts throughout the several views.

The reference numeral 1 designates the bar or lever which is formed with the rack 2 and with the integral head or stationary jaw 3 and provided with a handle 4.

5 designates the movable jaw which is slidable upon the bar 1 and is formed with an opening 6 to receive this bar, this opening being of greater cross-section than said bar, forming spaced-apart walls 77, between which is received a toothed bridge 8, and which walls are connected by a pin 11 secured to the movable jaw 5, said bridge being mounted and pivoted upon said pin. Said bridge has a notch 9 in which one end of a spring 10 is seated, the body of the spring being compressed between the bridge and a pin 11 connecting the walls 7, 7 and the opposite end of said spring being engaged by a metal loop 12 which connects the walls 7, 7. A handle 13 is carried by the bridge 8. Normally the teeth of the bridge firmly engage the teeth or rack 2 of the bar 1 and as the gripping ends of the jaws 3, 5 are upon the side of the bar 1 opposite to the said teeth and rack the strain caused by use of the wrench does not tend to move the teeth of the bridge with relation to the rack 2. A pull upon the lever or bar 1 in one direction will force the gripping side of the jaw 5 against the bar and a pull upon said bar in the opposite direction will force the teeth of bridge 8 and rack 2 more closely together, thus always insuring a positive purchase of the jaws 3, 5 upon the work, eliminating "slipping" or independent movement of the jaws in use. To re-adjust the jaws the jaw 5 is moved into the position shown dotted in Fig. 4 of the drawings by moving the handle 13 toward the jaw 3 thus disengaging the teeth of the bridge 8 from the rack 2 and compressing the spring 10 firmly between pin 11 and the bridge and in this position the movable jaw may be adjusted as desired upon the bar.

What is claimed is:—

A wrench including a toothed bar having a fixed jaw, a movable jaw having an opening receiving said toothed bar, said opening being of a greater cross-section than said bar forming spaced-apart walls having extending therethrough a transverse pin extending from said movable jaw said toothed bar being received between said walls and a bridge mounted and pivoted upon said pin, a loop secured to the sides of said movable jaw and upraised therefrom and positioned transversely of said movable jaw, fixed-jaw bar and bridge, and a resilient member looped under said transverse pin with one end extended under said loop, the other end of said spring having connection with said bridge, delivering pressure thereupon, the teeth of said bridge being in engagement with the teeth of said fixed jaw bar, normally, and the gripping ends of said movable and fixed jaws being upon the side of said fixed-jaw bar opposite to said teeth, whereby the strain resulting when the wrench is in use, does not tend to dislodge the teeth of said bridge from said fixed-jaw bar teeth.

In testimony that I claim the foregoing as my own I have hereto affixed my signature in the presence of two subscribing witnesses.

EDWIN NILSSON.

Witnesses:
HERMAN ANDERSON,
CATRINES DE HAAN.